July 1, 1941.　　　L. KAMENAROVIC　　　2,247,842
DEVICE FOR ELECTRIC CONTROL OF MOVABLE STANDS
Filed Nov. 4, 1938
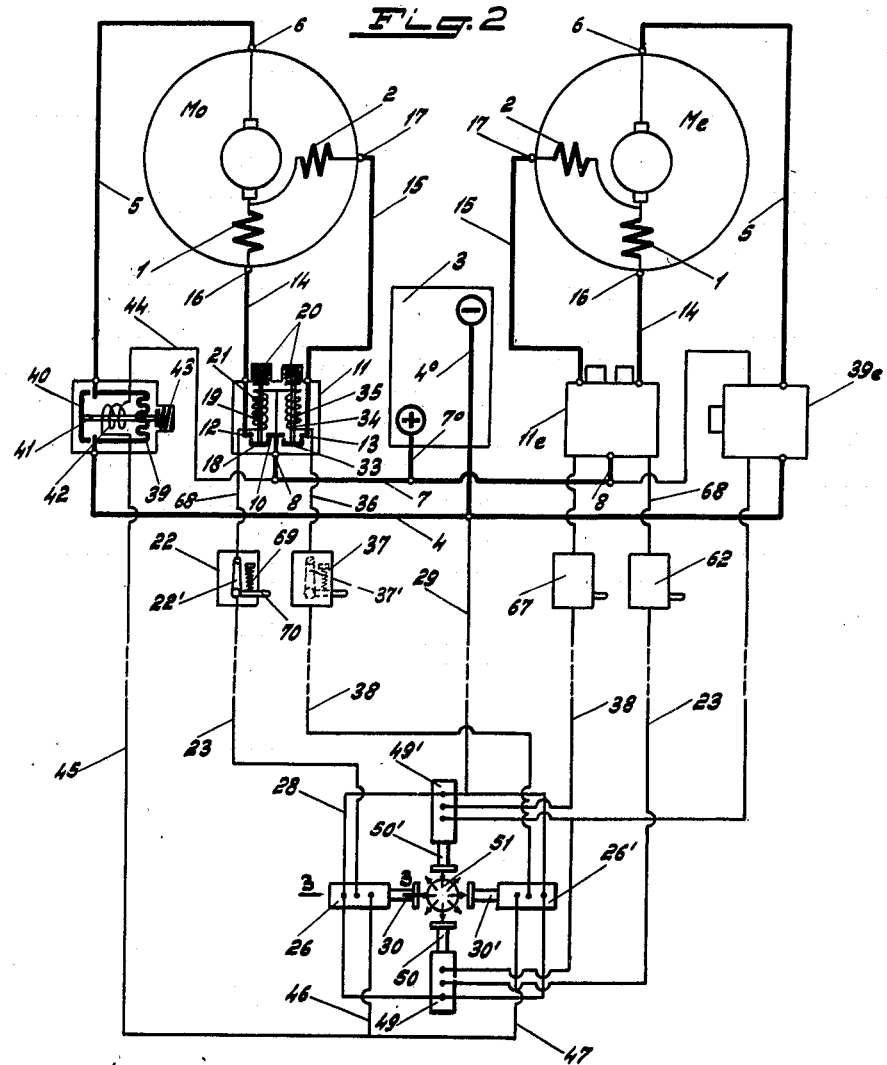
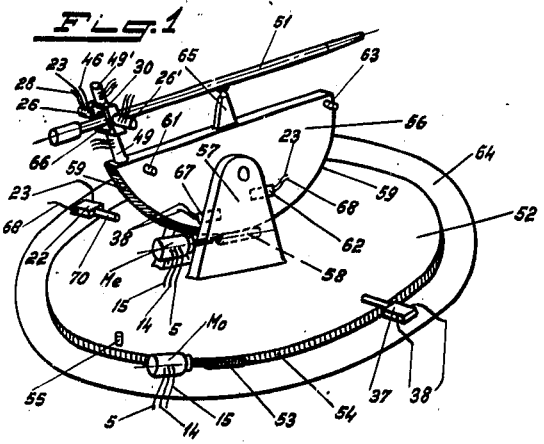
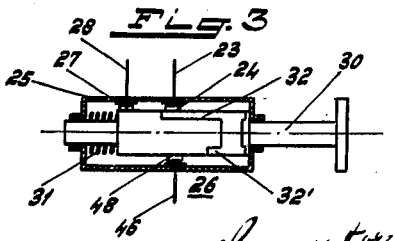

Patented July 1, 1941

2,247,842

UNITED STATES PATENT OFFICE 2,247,842

DEVICE FOR ELECTRIC CONTROL OF MOVABLE STANDS

Leone Kamenarović, Milan, Italy, assignor to Fabbrica Italiana Magneti Marelli Società Anonima, Milan, Italy, a corporation of Italy Application November 4, 1938, Serial No. 238,923
In Italy November 17, 1937

6 Claims. (Cl. 172—239)

This invention relates to means for the electric control of movable stands and more particularly to means for electric control of stands adapted to be moved both in horizontal and in vertical direction, such as embodied in connection with fire arms, search lights or the like in ships, aircraft, tanks and the like.

This invention comprises means of the above stated class in which the means controlling an electric motor which actuates the stand comprises a system of contactors operated by a single manipulating member which is initially moved by the operator in the particular direction and hand he desires to move the stand to take the intended position; said manipulating member may consist of a fire arm carried by the stand in connection with comparatively light arms, as machine guns and small ordnance guns.

This invention also includes contactors to be embodied in means of the above defined class which are arranged and operative to cause the stand actuating motor to run with a variable speed and more particularly with a speed in a ratio with respect to the amplitude of the initial movement imparted to the manipulating member or fire arm.

Further, the means of this invention may be arranged to actuate the stand at the same time in two directions at an angle and more particularly at right angles to each other as for the purpose of laying a gun on the line both in horizontal and vertical directions.

An embodiment of this invention is shown on the annexed drawing and

Figure 1 is a diagrammatical perspective view of a stand constructed in accordance with this invention, Fig. 2 is a diagram of the wirings of the stand actuating motors and of the control means therefor and Fig. 3 is a detail enlarged scale longitudinal section of one of said contactors as on line 3—3, Fig. 2.

As shown in Fig. 1, the stand includes a stationary support 64 on which a turn table 52 is mounted rotatably, said turn table 52 being actuated by an electromotor Mo driving a worm 53 in mesh with a worm-gear rim 54 provided on the turn table 52. Means hereinafter described and shown at 22, 37, 55 are provided on the support 64 and turn table 52 to restrict the angular movement of the turn table 52 with respect to the support 64.

A quadrant shaped cradle 56 is pivoted on a horizontal axis on brackets 57 rising from the turn table 52, said cradle being actuated by an electromotor fast on said brackets 57 and driving a worm 58 in mesh with a worm gear rim 59 provided at the periphery of the cradle 56. Cooperating motion restricting means as 67, 62, 61, 63 are provided on said turn table 52 and cradle 56 said motion restricting means operating as hereinafter described.

A member to be controlled and which is assumed to be a machine gun shown diagrammatically at 51 is mounted on an universal or ball support 65 carried by the cradle 56, and the breech end of said gun is embraced by a frame 66 on which oppositely located contactors 26, 26', 49, 49' are provided, said contactors 26, 26' lying in a horizontal line and said contactors 49, 49' lying in a vertical line.

Electric connections are shown in Fig. 1 cooperating with parts Mo, Me, 22, 37, 62, 67, 26, 26', 49, 49' to assist understanding of the operation of the stand, said connections being referenced to agree with the wiring diagram of Figures 2 and 3.

As apparent, the electomotors Mo and Me are adapted to cause movements in horizontal direction and in vertical direction respectively of the gun 51 by means of the above outlined supporting and driving means; each electromotor Mo and Me is provided with a series field including two oppositely-wound windings 1 and 2 to cause the motor rotor to rotate in opposite directions and said windings 1 and 2 are connected in such a manner as either of them only may be switched in during the operation.

Electric current is supplied to motors Mo and Me by a battery 3 having one terminal connected with a terminal of each motor by the leads 4°, 4, 5 and an intermediate graduating resistor 38 as hereinafter described; the opposite battery terminal is connected by means of wires 7°, 7, 8 with a common contact 10 of a double electromagnetic switch 11 whose other contacts 12 and 13 are connected by means of the wires 14 and 15 with the terminals 16 and 17 of the motor Mo the pairs of contacts 10, 12 and 10, 13 being selectively coupled by the respective bridges 18 and 33 under the action of control means as hereinafter described.

The bridge 18 intended to couple the contacts 10, 12 of the switch 11 is actuated by a core 19 of an electromagnet 21 having one end connected with the supply wires 7°, 7, 8 while its opposite end is connected through a wire 68, an end stroke breaker 22 (hereinafter referred to) and a wire 23, with a brush 24 of a contactor 26 hereinafter described; a compression return spring 20 acts to hold said bridge 18 spaced from cooperating contacts 10, 12 when the electromagnet 21 is de-energized.

The contactor 26 includes a stationary casing 25 carrying the brush 24 connected with the wire 23 and a further brush 27 connected by the wires 28, 29 with the battery connected wire 4, 4° as well as a further brush 48 connected with a wire 46 for a hereinafter described purpose. A slider 30 is mounted to reciprocate within the casing 25 against the action of a return spring 31 and carries a conducting bridge 32 adapted to couple the brushes 24 and 27 when said slider 30 is moved leftwards against the action of its return spring 31; a lug 32' of said bridge 32 is adapted to contact with the brush 48 of casing 25 when said slider 30 is moved to the end of its leftwards stroke.

As apparent the wires 23, 28, 46 and respective brushes 24, 27, 48 are electrically insulated from each other and from casing 25; likewise the bridge 32, 32' is electrically insulated from the slider 30 and casing 25.

The switch 11 includes a second bridge 33 adapted to couple its contacts 10 and 13; said bridge 33 is actuated by a core 34 and an electromagnet coil 35 as well as by a return spring 20; the coil 35 has one end connected with the wire 8 and with the supply battery 3 and its other end is connected through the wire 36, the stroke end breaker 37 and the wire 38, with a brush, as 24, of a contactor 26' identical with the above described contactor 26 and having its slider 30' aligned with and spacedly in front to the slider 30 of the contactor 26.

As above stated a resistor 39 is provided in the motor supply circuit; to cut off said resistor to secure a larger speed in the motor operation said resistor 39 is controlled in the hereinafter described manner. A bridge 40 is arranged across the ends of said resistor and is connected with the core 41 of an electromagnet 42 having one end connected with the battery through the wires 44, 8, 7, 7°; the other end of said electromagnet 42 is connected in parallel through the wires 45, 46, 47 with the brushes 48 of the two facing contactors 26, 26' cooperating, as above described, with the bridges as 32' of the sliders 30, 30' of the respective contactors, said bridges 32' being able to couple the brushes 48 with brushes 27 at the time either one of said sliders is moved to the end of its stroke beyond its position in which its bridge 32 couples the brushes 24 and 27. A compression spring 43 acts on the core 41 to resiliently hold said bridge 40 spaced from the ends of the resistor 39.

Each of the stroke end breakers 22, 37, 62, 67 includes a contact arm as 22' or 37' resiliently held in position by a spring 69 to couple the respective wires as 68, 23 said arm having a finger as 70 adapted to be engaged by a cooperating abutment as 55 or 61 or 63 of a cooperating member of the stand to break the associate motor circuit at the end of the largest admitted stroke in the direction and hand said breaker is devoted to, as occurred by effect of the respective movement of the cooperating members of the stand.

The circuits of the motor M*e* intended to carry out the movement of the cradle 56 and member carried thereby in another direction, for instance in elevation in the contemplated embodiment, are arranged and controlled in a manner similar to the above described one, with the cooperation of a pair of contactors 49, 49' identical with the above described ones 26, 26', said contactors having their sliders 50, 50' aligned and frontally spaced from each other.

As shown in Figs. 1 and 2 the pairs of contactors 26, 26' and 49, 49' are arranged on a frame 66 fast on the cradle 56 with their sliders 30, 30' and 50, 50' in aligned and spaced positions in front of each other by pairs, each pair of aligned sliders 30, 30' being located at right angles to the other one as 50, 50' and said pairs leaving an intermediate free space where the control member or gun 51 extends; said gun 51 is free to oscillate in all directions about its ball support 65 on the cradle 56 carrying the frame 66 and contactors 26, 26', 49, 49' as shown by arrows in Fig. 2 in respect of some of the possible directions of oscillation, a certain gap or lost motion being provided for intermediate said gun 51 when in its mean positions and the confronting ends of said sliders 30, 30', 50, 50'.

Assuming the device to be in inoperative position with the several parts in respective mean positions and the gun spaced from all the contactor sliders 30, 30', 50, 50', all the electromagnets 21, 35 and 42 are de-energized and accordingly the circuits of the motors M*o*, M*e* are cut out at contacts 18, 33 of the electromagnetic switches 11 and the bridges 40 are disconnected from the ends of the respective resistors 39 which are thus left operative in the motor supply circuits; in the above suggested conditions all the stroke end breakers are closed, their arms 22', 37' connecting the respective contacts and circuits.

At the time the operator moves the gun 51 towards the slider of either of said contactors 26, 26', 49, 49', as the slider 30 of the contactor 26, and said slider is moved inwardly of the respective casing 25 against the return action of spring 31, the bridge 32 of said slider couples the brushes 24, 27 and thus causes the energization of the electromagnet 21 through 3, 7°, 7, 8, 21, 68, 22', 23, 24, 32, 27, 28, 29, 3; the core 19 is thus shifted and it moves the bridge 18 to close the supply circuit of the winding 1 of the motor M*o* through 3, 7°, 7, 8, 10, 18, 12, 14, 16, 1, the rotor of motor M*o*, 6, 5, 39, 4, 4°, 3, said motor M*o* being thus fed in conditions to operate in a given direction.

The turn table 52 and cooperating parts are thus moved on one hand on the support 64, and said action develops as long as the gun 51 is held by the operator in position to hold the slider 30 in operative position, while said gun 51 follows the motion of the parts 52, 57, 56; as soon as the gun 51 is caused to release the slider 30, this slider is moved back by the spring 31 to cause the bridge 32 to be disconnected from brush 27, and then the electromagnet 21 is de-energized, the bridge 18 being thus moved by the cooperating spring 20 to cut the motor feeding circuit at contacts 10, 12. The parts are thus caused to stop in the position they have been carried into.

A similar operation to stop the parts occurs at the end of the largest admitted stroke, by effect of the cooperation of the finger 55 with the arm 70 of the respective breaker 22, the energizing circuit of the electromagnet 21 being then cut off at 22'.

Should the motion imparted by the operator to the gun 51 and slider 30 be such as to cause the slider 30 to go to the end of its stroke along casing 25, the bridge 32, 32' of said slider 30, after having coupled the brushes 24, 27, also engages the further brush 48 and closes the further circuit 3, 4°, 29, 28, 27, 32, 32', 48, 46, 45, 42, 44, 7, 7°, 3 to energize the electromagnet 42 and cause it to connect the bridge 40 across the ends of the resistor 39; said resistor 39 is thus short circuited, and the motor Mo is caused to operate with a larger speed owing to the removal of resistor 39 from its feeding circuit.

An operation similar to that described with respect to bridge 18 occurs in connection with bridge 33 at the time the slider 30' is operated by the gun 51, to make the field winding 2 of the motor Mo operative and cause the said motor to run in the opposite direction for the drive of the turn table 52 in an opposite horizontal direction, the operation of the means for short circuiting the resistor 39 and for actuating the breaker 37 is also similar to the above described one.

The operation of the motor Me causing the actuation of the cradle 56 in either hand around its horizontal pivot on brackets 57 is controlled by the contactors 49, 49' and respective sliders 50, 50' with the cooperation of the electromagnetic switch 11e, removable resistor 39e and breakers 62, 67 as described in connection with motor Mo and associate parts 26, 26', 30, 30', 11, 39, 22, 37.

If the gun 51 is shifted by the operator diagonally with respect to cross-arranged sliders 30, 30', 50, 50', both motors Mo and Me are caused to run at the same time each in a given direction, the duration and the speed of the operation of each of said motors depending upon the duration and extent of the action impressed by the said gun 51 or equivalent member on either of the sliders 30, 30', 50, 50'.

Of course, each of the resistors 39 may be divided into sections adapted to be short circuited successively in the described manner, or a movable tap may be caused to move along a resistor by the above described means to secure a gradual variation in the speed of the motors Mo and Me.

What I claim as my invention and desire to secure by United States Letters Patent is:

1. A device for actuating a member movable on a stand which in turn is movable on a support, said support being movable on a base member, comprising a reversible motor driving said stand on said support in a direction and in opposed hands along said direction, said motor having two field circuits for the motor operation in said opposed hands, a second reversible motor driving said support on said base member in a second direction at an angle to said first direction and in opposed hands along said second direction, said second motor having two field circuits for the operation thereof in said opposed hands, a supply of electric current for feeding said motors, control means for connecting each of said circuits with said supply, operating means for each of said control means, said operating means belonging to each of said motors being spaced from and aligned with each other in a pair and arranged to move in a direction corresponding to the said direction of the actuation imparted by the respective motor, said movable member extending intermediate said operating means and being arranged to move on said stand in both said directions and in both said hands along each of said directions with respect to said operating means and being adapted to shift either of said operating means of said pairs by effect of a displacement imparted to said member in the respective direction and hand on said stand.

2. A device for actuating a member movable on a stand which in turn is movable on a support, said support being movable on a base member, comprising a reversible motor driving said stand on said support in a direction and in opposed hands along said direction, said motor having two field circuits for the motor operation in said opposed hands, means in said circuits of said first motor for limiting the feed of current thereto, a second reversible motor driving said support on said base member in a second direction at an angle to said first direction and in opposed hands along said second direction, said second motor having two field circuits for the operation thereof in said opposed hands, means in said circuits of said second motor for limiting the feed of current thereto, a supply of electric current for feeding said motors, control means for connecting each of said circuits with said supply, operating means for each of said control means and said current feed limiting means of each of said motors, said operating means belonging to each of said motors being spaced from and aligned with each other in a pair and arranged to move in a direction corresponding to the said direction of the actuation imparted by the respective motor, said movable member extending intermediate said operating means and being arranged to move on said stand in both said directions and in both said hands along each of said directions and adapted to shift either of said operating means of said pairs to selectively energize either of said circuits of said motors and subsequently to make the respective feed limiting means inoperative in a first and a second step respectively, by effect of a displacement imparted to said member with respect to said stand and operating means of any of said pairs in the respective direction and hand.

3. A device for actuating a member movable on a stand which in turn is movable on a support, said support being movable on a base member, comprising a reversible motor driving said stand on said support in a direction and in opposed hands along said direction, said motor having two field circuits for the motor operation in said opposed hands, a second reversible motor driving said support on said base member in a second direction at an angle to said first direction and in opposed hands along said second direction said second motor having two field circuits for the operation thereof in said opposed hands, a supply of electric current for feeding said motors, switching means located on said stand each for connecting either of said circuits with said supply and a reciprocating plunger in each of said switching means for operation thereof said plungers belonging to each of said motors being opposite to and spaced from each other and arranged in a pair to reciprocate along aligned paths in a direction corresponding to said direction of the actuation imparted by the respective motor, said movable member extending intermediate said plungers and being arranged to move on said stand in both said directions and in both hands in each of said directions with respect to said plungers to shift either of them to operate the respective switching means by effect of a displacement imparted to said member in the respective direction and hand on said stand.

4. A device for actuating a member movable on a stand which in turn is movable on a support, said support being movable on a base member, comprising a reversible motor driving said stand on said support in a direction and in opposed hands along said direction said motor having two field circuits for the motor operation in said opposed hands, a second reversible motor driving said support on said base member in a second direction at an angle to said first direction and in opposed hands along said second direction said second motor having two field circuits for the operation thereof in said opposed hands, a supply of electric current for feeding said motors, electrically operated control means for connecting either of said motor field circuits with said supply, casings arranged in pairs on said stand the casings pertaining to the same pair being spaced from each other and aligned in a direction corresponding to said direction of the actuation imparted by one of said motors, insulated contact plugs in each of said casings said contact plugs of the casings of each pair being inserted across the circuit of said control means controlling either of said field circuits of the respective motor, a plunger mounted to reciprocate in each of said casings in the respective direction and having a bridge adapted to couple said contact plugs thereof, and a return spring in each casing and operative on the respective plunger to restore it in plug uncoupling position, said plungers being spaced from and opposite to each other in pairs and said movable member extending intermediate said plungers and being arranged to move on said stand in both said directions and in both hands in each of said directions with respect to said plungers to shift either of them to couple the respective contact plugs by effect of a displacement imparted to said member in the respective direction and hand on said stand.

5. A device for actuating a member movable on a stand which in turn is movable on a support, comprising a reversible motor driving said stand on said support in a direction and in opposed hands along said direction said motor having two field circuits for the motor operation in said opposed hands, means in each of said circuits for limiting the feed of current thereto, a supply of electric current, electric relay means for connecting each of said field circuits with said supply, electric control means for making each of said feed limiting means inoperative, two contactors on said stand spaced from and aligned with each other in a direction corresponding to said direction of said stand actuation and each comprising a stationary brush belonging to said electric relay means of one of said field circuits and a stationary brush belonging to said electric control means of the respective feed limiting means said brushes being aligned in the direction of the stand actuation and a plunger arranged to reciprocate with respect to the respective brushes in said direction and contacts on side points of said plunger for cooperation with said brushes to energize said relay and control means respectively, return means in each of said contactors resiliently holding the respective plunger and contacts thereof in position for de-energization of said relay and control means, each of said plungers and contacts when moved off from said de-energizing position energizing the respective relay and control means in sequence, said plungers of said contactors being spaced from and opposed to each other and said movable member extending intermediate said plungers and being arranged to move on said stand in opposite hands along said direction with respect to said contactors to shift said plunger of either of them from said de-energizing position thereof into its relay means and control means energizing position in sequence by effect of a displacement imparted to said member in the respective hand in said direction on said stand.

6. A device for actuating a member movable on a stand which in turn is movable on a support, said support being movable on a base member, comprising a reversible motor driving said stand on said support in a first direction and in opposed hands along said direction, a second reversible motor driving said support on said base member in a second direction at an angle to said first direction and in opposed hands along said second direction, each of said motors having two field circuits for the operation thereof in said respective opposed hands, means in each of said circuits for limiting the feed of current thereto, a supply of electric current, electric relay means for connecting each of said field circuits with said supply, electric control means for making each of said feeding limiting means inoperative, two pairs of contactors on said stand, the contactors of the first one of said pairs being spaced from and aligned with each other in a direction corresponding to the direction of said stand actuation on said support and the contactors of the second one of said pairs being spaced from and aligned with each other in a direction corresponding to the direction of said support actuation on said base member, each of said contactors of said first pair and second pair comprising two stationary brushes belonging respectively to said electric relay means and said electric control means of one of said field circuits of said stand driving motor and of said support driving motor respectively said brushes being aligned in the direction of actuation by the respective motor and a plunger adapted to reciprocate with respect to the respective brushes in said direction of actuation and contacts on side points of said plunger for cooperation with the respective brushes to energize said relay and control means in sequence, return means in each of said contactors resiliently holding the respective plunger and contacts thereof in position for de-energization of said relay and control means each of said plungers and contacts when moved off from said de-energizing position energizing the respective relay and control means in sequence said plungers of said contactors being spaced from and opposed to each other in each of said contactor pairs, and said movable member extending intermediate said plungers and being arranged to move on said stand in both said directions and in opposite hands along each of them with respect to said contactors to shift said plungers selectively from said de-energizing position thereof into its relay means and control means energizing positions in sequence by effect of a displacement imparted to said member in the respective direction and hand therealong on said stand.

LEONE KAMENAROVIĆ.